United States Patent [19]
Bernal

[11] Patent Number: 5,806,630
[45] Date of Patent: Sep. 15, 1998

[54] MODULAR MIST LUBRICATION SYSTEM

[75] Inventor: Carlos Gonzalez Bernal, Del Bosque de Tetlamoya, Mexico

[73] Assignee: Sistemas Centrales De Lubricacion, S.A. De C.V., Mexico

[21] Appl. No.: 773,064

[22] Filed: Dec. 24, 1996

[30] Foreign Application Priority Data

Jan. 4, 1996 [MX] Mexico ..................................... 960099

[51] Int. Cl.⁶ ................................................... F01M 1/00
[52] U.S. Cl. ........................ 184/6.26; 184/6.24; 184/55.1
[58] Field of Search ................................. 184/6.21, 6.24, 184/6.26, 55.1

[56] References Cited

U.S. PATENT DOCUMENTS

| | | | |
|---|---|---|---|
| 3,939,944 | 2/1976 | Mitchell et al. | 184/6.26 |
| 4,353,435 | 10/1982 | Abrams et al. | 184/55.1 |
| 5,011,388 | 4/1991 | Aoki et al. | 184/6.24 |
| 5,125,480 | 6/1992 | Gregory et al. | 184/6.26 |
| 5,205,377 | 4/1993 | Pfarrwaller et al. | 184/6.26 |
| 5,318,152 | 6/1994 | Ehlert | 184/6.26 |
| 5,584,360 | 12/1996 | Wedevew | 184/6.26 |
| 5,623,870 | 4/1997 | Daniel | 184/6.14 |

FOREIGN PATENT DOCUMENTS 532050  10/1956  Canada ................................. 184/6.26

*Primary Examiner*—Thomas E. Denion
*Attorney, Agent, or Firm*—Roylance, Abrams, Berdo & Goodman, L.L.P.

[57] ABSTRACT

In the modular oil mist generator, the mist is produced in a generating chamber which contains oil. The mist exits the generator, enters the equipment to be lubricated, exits the equipment and returns to the generator by use of an ejector. The air is separated from the oil (demisting) by use of a coalescent filter. The air returns to the atmosphere and the oil condensate is introduced into the generating chamber by demisting in a demisting chamber at a higher pressure than the generating chamber causing the passage of oil from one to the other chamber, by demisting in a chamber with lower pressure than the generating chamber and using a pneumatic pump to cause the passage of oil from one to the other chamber, or by directly introducing the condensates without use of a demisting chamber. The oil level in the generating chamber is regulated with a float valve which closes when the level reaches its maximum, preventing oil passage. It opens when the oil level drops, allowing passage of the oil.

15 Claims, 3 Drawing Sheets

MODULAR MIST LUBRICATION SYSTEM

FIELD OF THE INVENTION

The present invention relates to a lubrication system which generates an oil-air mist, conveys the mist to equipment to be lubricated and then recycles the oil returned to the system from the equipment. More particularly, the present invention relates to a lubrication system where the recycled mist from the equipment is separated into oil and air in a filter and an ejector assists in returning the mist from the equipment and passing the mist through the filter.

BACKGROUND OF THE INVENTION

For some years oil mist base lubrication or maintenance systems are indispensable elements in equipment lubrication operations in industrial plants and especially in industries where pumping equipment is widely used. Such arrangements have been in the form of central lubrication systems, which either include ecological collectors to demist the excesses of oil-mist or closed-loop circuits to allow reutilization of the oil. The ecological collectors do not completely separate the air from the oil. The closed-loop systems contain manual pumps for recycling of the condensed oil. The attention required for operation of manual pumps constitutes a problem. The initial investment of the centralized systems is very high. In previously used operations, a lubrication system of this type requires preparation of a detailed system of engineering for installation, and the installation time is great and extremely costly.

"Machinery's Handbook" of E. Oberg, F. D. Jones and H. L. Horton (21st edition Ed. Labor); "Tribological Performance Evaluation of Oil Mist Lubrication" of A. Shamim: C. F. Kettleborough (Texas A&M University, College Station, Tex. 77843-31213) and "Enhanced Reliability Through Engineered, Closed-Loop Oil Mist Systems) of Thomas K. Ward (Thailand's first Chemical & Refining Plant Maintenance Conference Oct. 26–28, 1994) disclose conventional centralized lubrication systems, lubrication systems with a mist base and lubrication systems with closed-loop and a mist base are already known.

Central lubrication systems comprise a lubricant receptacle and a console which regulates the doses of lubricant and controls some features such as pressure, temperature and viscosity, among other things. Additionally, the console conveys the lubricant toward a network of pipes which distribute it to the various local points to be lubricated in the equipment making up an industrial plant. Also, manual control is reduced with the diminution of human error and omission.

The mist base lubrication system is a central lubrication system in which the energy from a compressed gas (customarily dry compressed air taken from the air supply by instruments) is used to atomize lubricating oil. The lubricating oil is transported by the air in a low pressure distribution system to the various points to be lubricated. Due to the turbulence induced or caused by the movement of the tribo-mechanical system to the point of application, the particles of oil coalesce and produce very large drops. The drops moisten the interfacing surfaces of the tribo-mechanical system for lubrication of the equipment.

Closed-loop mist base lubrication systems are characterized by a line or line network for returning the mist. The returning of the lubricant to a tank and the recycling of the mist are known. Presently, the mist in these systems is transported by a low pressure distribution system to the various points to be lubricated.

The mist passes through the equipment. Upon exiting from the equipment, the oil condensate is recaptured in a small steel receptacle. This receptacle is affixed to the floor and contains a pump (ecological collector with pump) to transport the mist and its condensates to a second network of tubes directed toward a closed receptacle causing separation of the oil from the air by a rotating mechanical filter. With this arrangement, the oil is recycled to generate the mist, and the already clean air is released into the atmosphere.

These systems, to lubricate a great number of equipment installations, require the installation of two tubing networks, one to convey the mist and the other to return it. This situation requires detailed engineering and the installation time is costly, raising the total cost of installation of the arrangement, and is not profitable for the use of lubrication by mist in small equipment.

In consideration of the preceding, a modular lubrication system which allows recycling of the oil contained in the mist to lubricate small equipment becomes indispensable. Also, a system is needed which can be installed rapidly at any site and used where compressed air is available, and which requires neither detailed engineering nor any type of support to affix it to the flooring.

SUMMARY OF THE INVENTION

According to "Disenyo en Ingenieria Mecanica" by Joseph Edward Shingley (2d edition, Ed. McGRAW HILL, p. 104), Fundamentals of Lubrication-Part 12, Industrial Applications Industrial Lubrication" by Ellis F. G. (Vol. 19, No. 2) and "Manual Universal de la Technica Mecanica (Machinery's Handbook) by E. Oberg, F. D. Jones and H. L. Horton (21st edition, ed. Labor), the objective of lubrication is to reduce friction, wear and heat wear of the machine elements which move with respect to one another. The substances which perform these functions upon introduction between the surfaces in movement relative to one another are called lubricants. Therefore, a lubricant is employed for one or more of the following objectives:

a) to reduce friction,
b) to avoid wear,
c) to avoid adhesion,
d) to contribute to the distribution of the load,
e) to cool the moving elements, and
f) to avoid corrosion.

It is important to note that the following types of lubricants are available:

a) petroleum derivatives,
b) synthetic lubricants,
c) greases,
d) solid pellicles,
e) working fluids,
f) gases (e.g. oil mist),
g) plastics,
h) animal fat,
i) metal and mineral pellicles, and
j) vegetable oils.

The technology of lubrication by mist is used in systems installations which generate, transport and apply the lubricant mist. No movable parts are involved, making the systems very reliable while requiring minimum maintenance. The center of these mist lubrication systems is the generator, which utilizes the energy of compressed air to atomize the lubricant into particles of micrometrical dimensions. In this form, the light mixture of air and lubricant is known as oil mist, which can be transported in a radius of up to 200 meters through distribution lines to lubricate the strategic points of the rotary equipment.

The mist presents the following advantages over conventional lubrication systems:

(i) Breakdowns in two-part metal (bullet) molds are reduced by 90%. Few maintenance problems are present and production downtime is considerably reduced. It adapts simply to most equipment.

(ii) Lubricant consumption is reduced by 90–95%. Dosed quantities of lubricant are applied at each point to be lubricated. A quantity of only a few ounces of oil mist supplies as much lubrication as is obtained with use of large quantities of conventional lubrication.

(iii) The equipment operates at very low temperatures. Two-part molds work at lower temperature upon application of oil mist since the mist operates as heat conductor. Moreover, excessive lubrication and the formation of residues resulting from the friction of the rotary equipment are avoided.

(iv) Energy savings. The rotary equipment lubricated by the mist lubrication system uses less energy than is required by traditional systems.

(v) The entry of contaminants is avoided. As long as light pressure and a minimal flow of lubricating mist are maintained between the cavities in the machinery, the entry of contaminants is not possible. The problems caused by closed two-part molds are minimized, since the positive pressure and the flow of mist prevent the closed interfaces from being tightly pressed together.

(vi) Distribution of the lubricating mist. The lubricating mist exiting from the head of the generator is conducted by low pressure distribution tubing lines until it reaches the point to be lubricated. At the lubrication point the oil mist passes through a reclassifier, an attachment with a small orifice which fills two functions. The first function involves converting the particles of oil mist produced in the head (dry mist) into particles of larger dimensions, which in an effective manner lubricates the travel movement (purging mist). The second function involves measuring the quantity of lubricant into doses. The largest quantity of lubricant will be required during the travel movement, at the orifice of the reclassifier element.

(vii) Economic justification. Rapid recovery of the investment and high yield of these systems.

The invention comprises a modular generator which supplies oil mist to small equipment assemblies to be lubricated. The equipment generates oil mist by means of technological Vortex or Venturi movements (which are not part of this invention) and distributes the mist through a tubing system until it arrives at the points to be lubricated. The use of an ejector provides the equipment with the capacity to generate a vacuum in the return lines to aspirate the excess oil mist and the oil condensate particles coming from the lubricated equipment. By means of this ejector, these excesses are introduced into a demisting chamber in which the air is separated from the oil by means of a coalescent filter, to demist the mist. When a float with a valve is used, the travel of the condensed oil which is obtained in the demisting chamber is graduated as it passes toward the generating chamber of the system.

This travel can take place by means of a pneumatic pump, or by means of the existence of a pressure in the demisting chamber which is greater than the pressure in the generating chamber.

Once the oil has returned to the generating chamber, the cycle is completed, and the equipment is capable of returning to generating mist with the oil, and thus, carrying out its function as a recirculating system. The oil, which is condensed inside a filter, installed without a collecting receptacle, can be recaptured by a tube called a "condensate drain." If the contrary is the case, it is not installed.

It is feasible to eliminate use of the demisting chamber by means of a tube which extends from the exit of condensates from the coalescing filter to the mist generating chamber, thus terminating the cycle.

The following are the advantages of the present invention:
(i) Increased operational efficiency;
(ii) Avoidance of the emission of used oil into the atmosphere;
(iii) Lengthening the useful life of the lubricated machinery;
(iv) Easier of installation and adaptation to existing equipment;
(v) Allowance of the use of synthetic oils;
(vi) Substantially reduced the consumption of electric energy;
(vii) No requirement of continuous maintenance;
(viii) Lack of friction wear;
(ix) Maintenance of the oils in use and the equipment always being clean;
(x) Reduced corrective maintenance of the equipment at least by half;
(xi) Reduced friction coefficients by 25%;
(xii) Reduced operation temperature of the travel movements by 10 degrees C. on an average;
(xiii) Impeded entry of contaminants into the equipment;
(xiv) Reduced oil consumption by virtually 100%;
(xv) Maintenance of equipment during down times;
(xvi) Impeded contamination, since demisting of the mist takes place with over 90% effectiveness; and
(xvii) Lower initial investment since it is not necessary to carry out detailed engineering and support for positioning the equipment.

Conventional lubrication arrangements are mainly directed toward great numbers of equipment installations for their lubrication, with detailed engineering and costly initial investment. Although conventional mist base centralized systems exist in the form of closed-loop and/or recirculating systems, with computerized or extremely simple console generators, and with large-volume oil tanks (up to 110 gal.), not one of these systems is cost-effective for lubricating small pieces of equipment by the closed-loop and/or recirculating plan. With the new installation design of this invention, the installation of the central mist base lubrication system is greatly simplified.

Other objects, advantages and salient features of the present invention will become apparent from the following detailed description, which, taken in conjunction with the annexed drawings, disclose preferred embodiments of the present invention.

BRIEF DESCRIPTION OF THE DRAWINGS

Referring to the drawings which form a part of this disclosure.

DETAILED DESCRIPTION OF THE INVENTION

A. The Embodiment of FIG. 1

Figure 1:
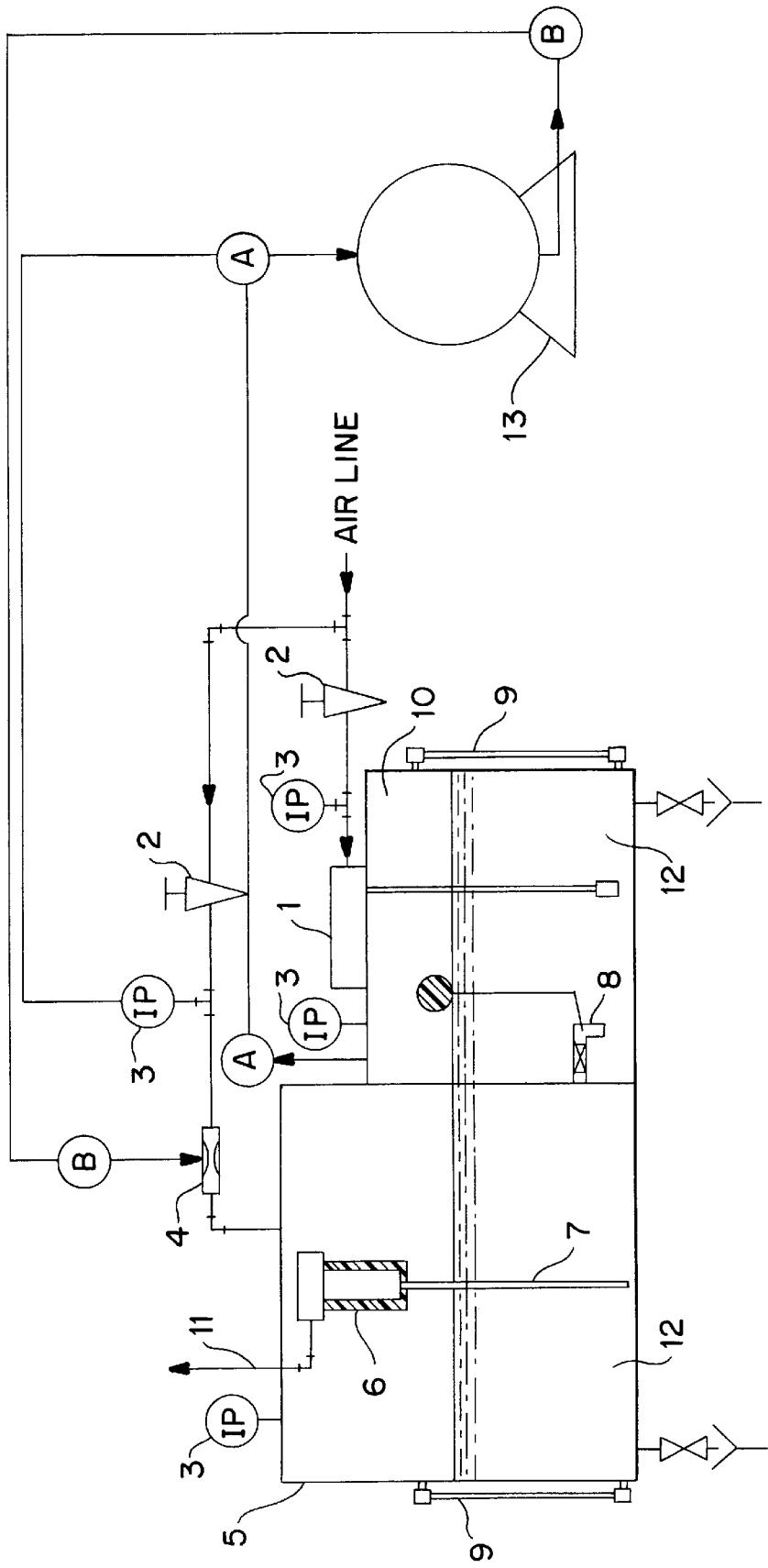
FIG. 1 is a side elevational view in section of a modular lubrication system according to a first embodiment of the present invention which naturally recycles oil by pressure differential.

FIG. 1 shows a longitudinal section of a modular lubrication system including natural oil recycling by pressure differential. The system includes a mist generator head 1 for generating oil mist, as already known either using the Vortex principal or using the Venturi principal.

A pressure regulating valve has an integral filter 2 for filtering the air and eliminating all types of impurities, and a manometer 3 for regulating and measuring the pressure of the air.

An ejector 4 generates a higher pressure in the chamber where the mist is being demisted (separation of the air from the oil), than the pressure in which it is generated, and thus facilitates the return of oil and causes the mist to travel through the filter. The ejector increases the pressure in the demisting chamber from atmospheric pressure up to 10 psi. Additionally, the ejector produces a vacuum to aspirate the mist return lines and to simultaneously pressurize the demisting chamber. A minimum pressure of 30 psi is required to adjust the ejector entrance to raise the demisting chamber pressure by more than 5 psi.

A demisting chamber 5 comprises a closed tank in which a coalescent filter is installed. The coalescent filter separates the air from the oil contained in the mist. The pure air is dispersed in the atmosphere, while the oil is collected in the base of the chamber for reuse.

Coalescent filter 6 carries out the demisting of the mist, and can be installed in two different manners, i.e., without a receptacle (carrying out the demisting of the mist by means of the work of the cartridge from the outside to the inside), or with the receptacle and an automatic purge valve (carrying out the demisting by operation of the cartridge from the inside to the outside). Filter 6 has a filtering medium of 0.1 microns to 10 microns, and does not use rotary element to separate the air and oil.

A condensate drain tube 7 collects the oil condensed between the filter and the housing of the filter, which is installed without a receptacle. In the opposite case, the drain tube is not installed.

A float valve 8 controls the level of oil in the mist generating chamber.

Level-viewing windows 9 enable the operator to see different visible levels of oil. Thus, it is possible to know the oil level which is maintained in both chambers of the system.

A generating chamber 10 comprises a closed oil tank. The generator head of the mist generator is mounted in the top part of the oil tank. Generating chamber 10 holds a tube in position, by means of which this head aspirates the oil by means of the Vortex principal or the Venturi principal and mixes the oil with the air coming from the compressed air lines. In this manner, the oil mist is formed for transmission to the piece of equipment 13 to be lubricated or maintained.

In operation, the modular lubrication system incorporating natural return of oil by pressure differential has the compressed air line connected to a "tee" where the air line is bifurcated and parts of the air flow pass into two paths. In both paths, the air flows through a pressure regulating valve, with integral filters 2 and manometers 3 for controlling the air pressure. The two air regulation lines are involved in the same manner.

One of these lines is connected to mist generator head 1. By means of the Vortex principal or the Venturi principal, mist generator head 1 aspirates the oil found in generating chamber 10, mixes it with the air and forms the oil mist at a pressure of 10–100 inches $H_2O$. The pressurized oil mist is introduced into a piece of equipment 13 to be lubricated through points A. The mist exits equipment 13 at points B and enters ejector 4 which aspirates it and causes it to pass through a coalescent filter 6. The other regulated air line is connected to ejector 4. The result is that the air-oil mixture (mist) is impoverished and the pressure rises (up to 20 psi) when entering the demisting chamber 5. In demisting chamber 5, the mist passes through coalescent filter 6, which separates the air from the oil.

The oil is condensed by being strained in the exterior part of the filter and drops into the bottom part of the demisting chamber. The oil which has been condensed in the interior part of the filter drains through condensate drain tube 7 and drops into the bottom part of the chamber. The air is dispersed through the atmosphere line 11. Because the pressure in the interior of chamber 5 is greater than in generating chamber 10, the oil 12 regresses in a natural manner.

A float valve 8 controls the level of oil in the generating chamber. At the moment the oil level lowers, the valve is opened, allowing the oil to pass freely from chamber 5 to chamber 10. At the moment the oil attains its maximum level in chamber 10, the valve is closed, allowing the oil to accumulate in the demisting chamber. The oil levels of both of the oil chambers can be viewed through the level-viewing windows 9.

B. The Embodiment of FIG. 2

Figure 2:
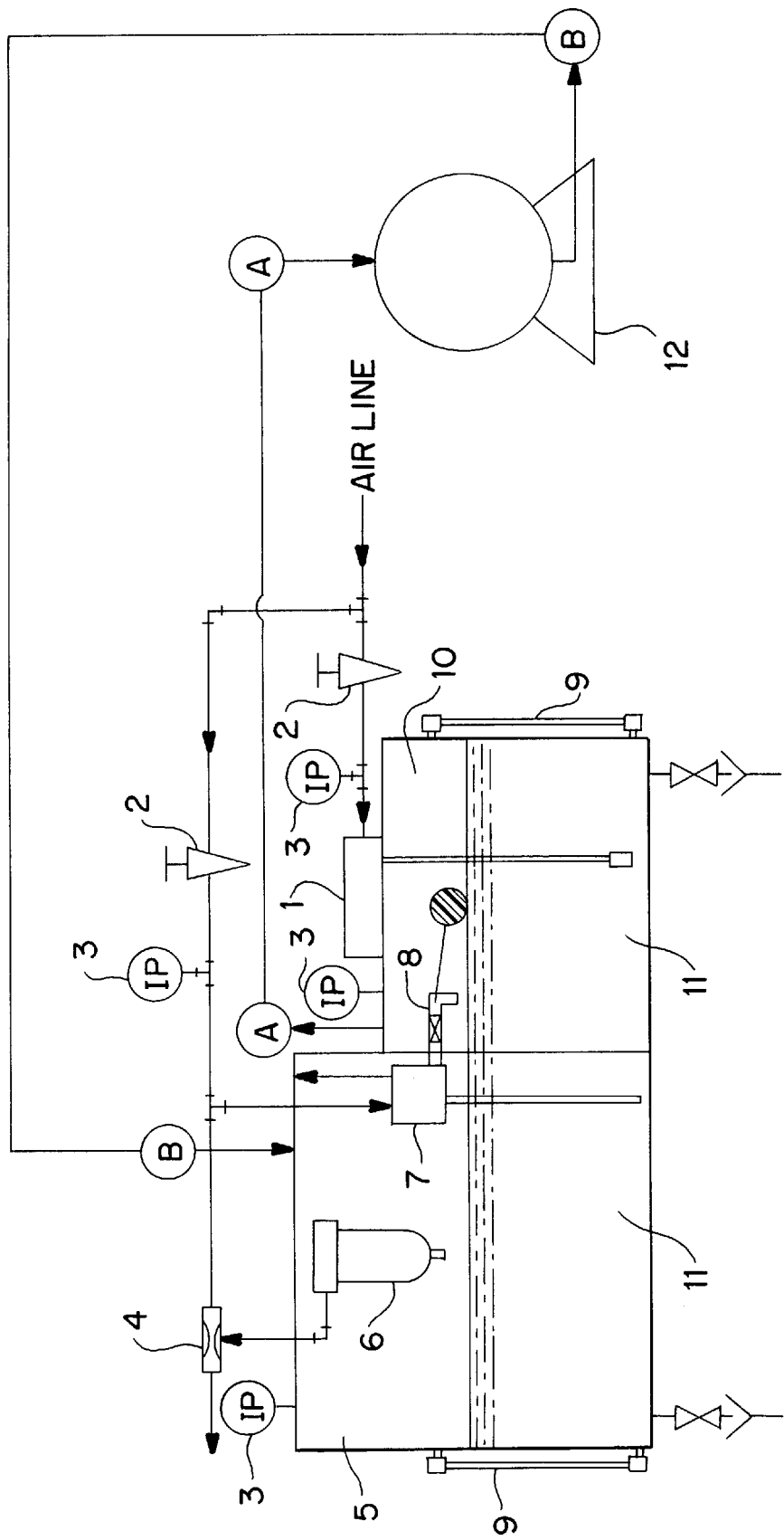
FIG. 2 is a side elevational view in section of a modular lubrication system according to a second embodiment of the present invention which recycles oil by means of a pneumatic pump.

FIG. 2 shows a longitudinal section of a modular lubrication system for recycling the oil by means of a pump.

Mist generator head 1 generates oil mist by means of the Vortex principal or by means of the Venturi principal as already known.

A pressure regulation valve has an integral filter 2 for filtering the air and for eliminating all types of impurities, and a manometer 3 for regulating and measuring the pressure of the air.

An ejector 4 generates a higher pressure in the chamber where the mist is being demisted (separation of the air from the oil) than that where the mist is generated. This pressure differential facilitates the return of oil and causes the mist to pass through the filter.

A demisting chamber 5 has a closed tank in which a coalescent filter is installed. The coalescent filter separates the air from the oil contained in the mist. The pure air is dispersed into the atmosphere. The oil is collected in the bottom of the demisting chamber for reuse.

Coalescent filter 6 carries out the demisting of the mist and can be installed in two different manners. It can be installed either without receptacle, (carrying out the demisting of the mist by means of the outside cartridge working toward the inside), or with a receptacle and automatic purge valve (carrying out the demisting by means of the operation of the inside cartridge toward the outside).

A pneumatic pump 7 transports the oil from the demisting chamber to the generating chamber.

A float valve 8 controls the oil level in the mist generating chamber.

Level-viewing windows 9 permit viewing of the levels of oil maintained in both chambers.

A generating chamber 10 has a closed oil tank holding the mist generator head mounted in its top part. The head positions a tube for aspirating the oil by means of the Vortex principal or the Venturi principal and mixes it with the air coming from the compressed air line, thus forming the oil mist to be transmitted to the pieces of equipment to be lubricated or maintained.

In operation, the modular lubrication system recycles the oil by pump 7. The compressed air line is connected to a "tee" where the line is bifurcated and follows two different paths. The compressed air passes in each case through a pressure regulation valve with integral filter 2 and at the same time through manometer 3 for controlling the air pressure, thereby providing two air regulation lines.

One of these lines is connected to a mist generator head 1. By means of the Vortex principal or the Venturi principal, the mist generator head aspirates the oil in generating chamber 10, mixes it with the air, and thus, forms the oil mist at a pressure of 10–100 inches $H_2O$. The oil mist is introduced into a piece of equipment 12 to be lubricated at points A. The mist exits from the piece of equipment 12 (points B), enters a demisting chamber 5, and passes through coalescent filter 6 to separate the air from the oil. Following condensation of the oil, the oil is drained automatically and drops into the bottom part of the demisting chamber.

The other regulated air line is connected to an ejector 4. The ejector produces the vacuum of between 0.5 and 5 psi in the mist return lines extending from the lubricated equipment to the demisting chamber, which causes the mist to pass through the filter and causes the excess oil mist and oil condensation in the mist return lines from the lubricated equipment to aspirate.

Because the pressure in demisting chamber 5 is lower than that in generating chamber 10, the recycling of oil is accomplished by a pneumatic pump 7 which conveys the oil at the propitious moment to a lower level of the oil. The float valve 8 is opened to allow passage of the oil 11. In the contrary case, at the moment when the oil level has reached its maximum, the float valve is closed and the pneumatic pump is triggered automatically, thus controlling the oil level.

The oil level in both chambers can be viewed through level-viewing windows 9.

C. The Embodiment of FIG. 3

Figure 3:
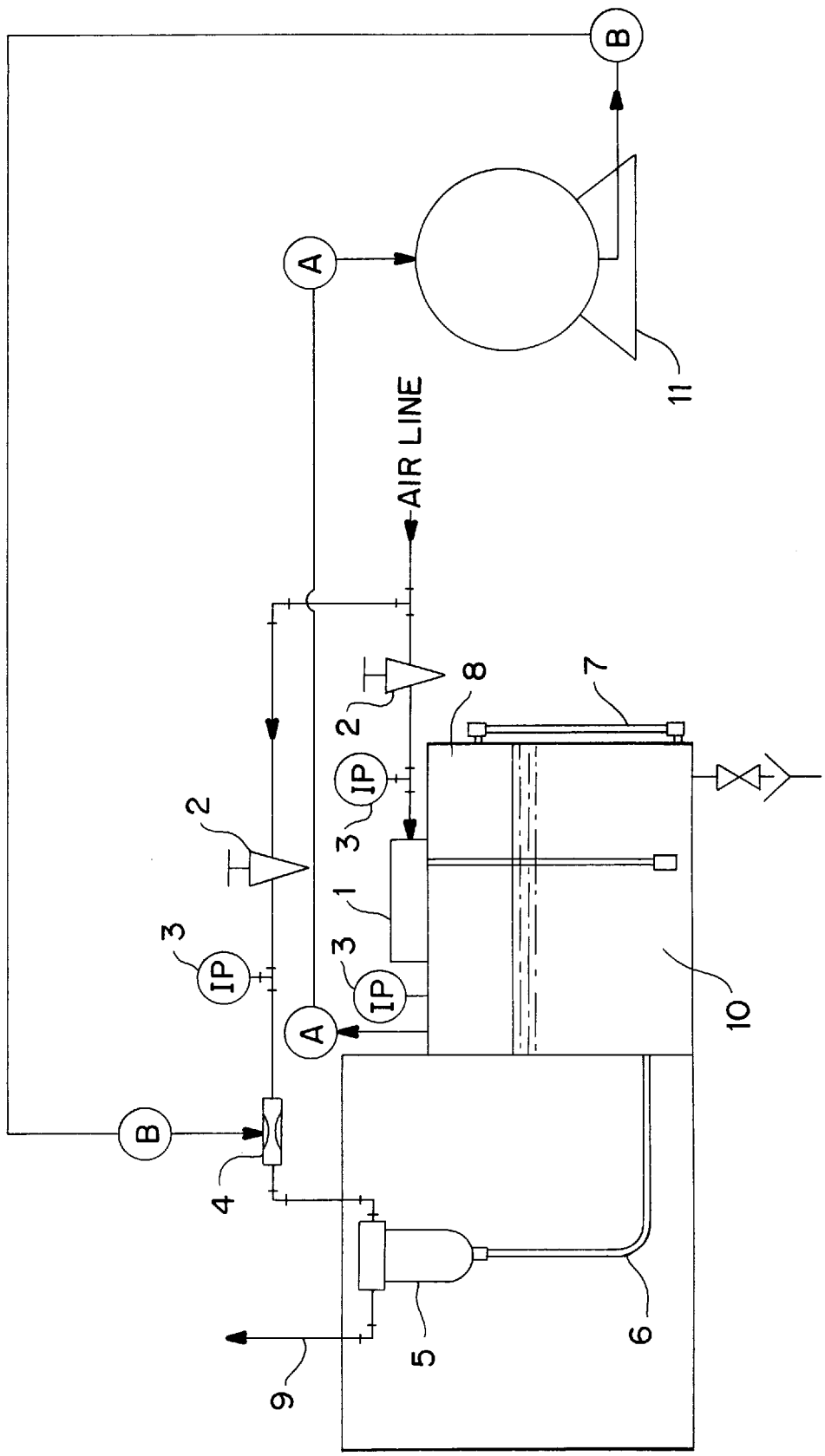
FIG. 3 is a side elevational view in section of a modular lubrication system according to a third embodiment of the present invention which recycles oil without a demisting chamber.

FIG. 3 shows a longitudinal section of a modular lubrication system for recycling oil without demisting chamber. The system comprised a mist generator head 1 for generating an oil mist, as already known to operate by means of the Vortex principal or by means of the Venturi principal.

A pressure regulator valve has integral filter 2 for filtering the air and eliminating any type of impurities and a manometer 3 to regulate and measure the pressure of the air.

An ejector 4 generates a higher pressure in a chamber of coalescent filter 5 where the mist is demisted (separation of air from oil) than is present where the mist is being generated. This facilitates the recycling of oil and causes the mist to pass through the filter. The pressure is measured from atmospheric pressure up to 10 psi.

A coalescent filter 5 carries out the demisting.

Condensates 6 are recycled by means of tube 6. The oil is condensed between the filter on the interior of the generation chamber, and is recycled through this tube.

A level-viewing window 7 permits viewing of the level of oil to know the level of oil held in the mist generating chamber.

A generating chamber 8 comprises a closed oil tank with the mist generator head mounted in its top part. The mist generator positions a tube. By means of the tube, head 1 aspirates the oil by the Vortex principal or the Venturi principal, and mixes it with the air from the compressed air line. Thus, the oil mist is formed for transmission to the equipment 11 to be lubricated or maintained.

In operation, the modular lubrication system for recycling oil without a demisting chamber has the compressed air line connected to a "tee" where it is bifurcated and follows two paths. Each path extends through a pressure regulator valve with integral filter 2 and a manometer 3 for controlling the pressure of the air, creating two lines of regulated air.

One of these regulated air lines is connected to mist generator head 1. By means of either the Vortex principal or the Venturi principal, mist generator head 1 aspirates the oil in generating chamber 8, mixes the oil with the air, and thus, forms the oil mist at a pressure of 10–100 inches $H_2O$. The pressure oil mist is introduced to a piece of equipment 11 to be lubricated through points A. The mist exits from the piece of equipment 11 through points B and enters ejector 4. Ejector 4 aspirates it and causes it to pass through coalescent filter 5. The other line of regulated air is connected to this ejector, causing the air-oil mixture to become impoverished and the pressure to increase to as high as 20 psi. In this condition, the air-oil mixture enters coalescent filter 5, which separates the air from the oil.

The oil which is condensed in the filter drains off through condensate return tube 6 and enters generating chamber 8. This terminates the cycle.

The level of oil in the chamber 8 can be viewed through level-viewing windows 7.

The primary method known for execution of the present invention involves the natural recycling of oil by pressure differential. The condensed oil flows from the demisting chamber toward the generating chamber by virtue of the higher pressure in the demisting chamber than in the generating chamber. The condensed oil from the demisting chamber is conveyed by use of a float valve. The float valve is closed when the oil in the generating chamber rises to its maximum level and is opened when the oil level lowers to permit passage of the oil.

The modular system for mist, as described, can be used in many environments, such as the petroleum industry and for the processing of hydrocarbons, as in petrochemical industries, refining, steelmaking, papermaking, cement manufacture, textile, mineral and energy generation, among others. It especially can be used to lubricate small equipment such as pumps, electric motors, compressors and gear boxes, among other things. For example, in industrial plants which include small groups of pieces of equipment or where the pieces of equipment are isolated from the other areas (more than 20 m) without any tube network or without any possibility of supporting the mist head, the present invention can be effectively employed. Non-effective lubrication of these pieces of equipment has resulted due to the large number of support structures which have to be put in position to obtain such effects. Also, the present invention is effective on oil drilling platforms or in ships wherein the space limitations are very critical. In dangerous zones where equipment installations are in danger of explosion, the basic modular mist system of the present invention is effective since it is completely pneumatic and uses no electric components. In situations where no electric power is available and only compressed air is available, the present invention can be used.

While various embodiments have been chosen to illustrate the invention, it will be understood by those skilled in the art that various changes and modifications can be made therein without departing from the scope of the invention as defined in the appended claims.

What is claimed is:

1. A modular lubrication system, comprising:
   a mist generating chamber having a lubrication oil supply;
   a oil mist generator mounted on said mist generating chamber and connected to said oil supply;
   first coupling means for connecting said mist generating chamber to equipment to be lubricated to convey lubricating mist to the equipment;
   second coupling means for connecting said mist generator to an air pressure source;
   a filter, mounted adjacent said mist generating chamber, for separating air and oil;
   third coupling means for connecting the equipment to the filter to convey lubricating mist from the equipment to said filter, said third coupling means including an ejector; and
   a recycling conduit, adjacent said filter, for conveying oil separated from lubricating mist by said filter to said oil supply in said mist generating chamber.

2. A modular lubrication system according to claim 1 wherein
   said filter is a coalescent filter.

3. A modular lubrication system according to claim 1 wherein
   fourth coupling means connects said ejector to the air pressure source.

4. A modular lubrication system according to claim 3 wherein
   said filter is mounted in a demisting chamber.

5. A modular lubrication system according to claim 4 wherein
   said ejector is connected to an interior of said demisting chamber to generate a higher pressure in said demisting chamber exteriorly of said filter.

6. A modular lubrication system according to claim 5 wherein
   said demisting chamber is at a higher pressure than said mist generating chamber.

7. A modular lubrication system according to claim 6 wherein
   said filter comprises a condensation drain tube to convey oil condensed from lubrication mist into a recycle oil storage in said demisting chamber.

8. A modular lubrication system according to claim 4 wherein
   said demisting chamber comprises a recycle oil storage; and
   said recycling conduit couples said recycle oil storage to said oil supply in said mist generating chamber through a float valve in said mist generating chamber.

9. A modular lubrication system according to claim 8 wherein
   said ejector is connected to an interior chamber of said filter to cause mist returning from the equipment to pass through said filter.

10. A modular lubrication system according to claim 9 wherein
    said demisting chamber is at a lower pressure than said mist generating chamber; and
    a cycle conduit comprises a pneumatic pump.

11. A modular lubrication system according to claim 3 wherein
    said ejector is connected to an interior chamber of said filter to cause mist returning from the equipment to pass through said filter.

12. A modular lubrication system according to claim 11 wherein
    said recycle conduit directly connects said filter to said oil supply in said mist generating chamber.

13. A modular lubrication system according to claim 1 wherein
    said mist generating chamber comprises a window for viewing an oil level in said oil supply.

14. A modular lubrication system according to claim 1 wherein
    said ejector generates a reduced pressure in said third coupling means for aspirating excess oil mist and oil condensate from the equipment.

15. A modular lubrication system according to claim wherein
    said filter comprises a filter medium of about 0.1 to about 10 microns.

* * * * *